US012741682B2

(12) United States Patent
Li et al.

(10) Patent No.: US 12,741,682 B2
(45) Date of Patent: Sep. 22, 2026

(54) TRAIN SPEED ESTIMATION DEVICE AND METHOD BASED ON VIBRATION SIGNALS

(71) Applicants: Aktiebolaget SKF, Gothenburg (SE); SKF (China) Co Ltd, Shanghai (CN)

(72) Inventors: Wenjun Li, Shanghai (CN); Haiyong Han, Shanghai (CN); Gang Cheng, Shanghai (CN); Jim Wei, Shanghai (CN)

(73) Assignees: Aktiebolaget SKF, Gothenburg (SE); SKF (China) Co Ltd., Shanghai (CN)

( * ) Notice: Subject to any disclaimer, the term of this patent is extended or adjusted under 35 U.S.C. 154(b) by 603 days.

(21) Appl. No.: 17/485,460

(22) Filed: Sep. 26, 2021

(65) Prior Publication Data

US 2022/0135095 A1 May 5, 2022

(30) Foreign Application Priority Data

Nov. 3, 2020 (CN) ........................ 202011209740.8

(51) Int. Cl.
*B61L 15/00* (2006.01)
*B61L 25/02* (2006.01)
(Continued)

(52) U.S. Cl.
CPC .............. *B61L 25/021* (2013.01); *G01P 3/02* (2013.01); *H04Q 9/00* (2013.01); *H04Q 2209/40* (2013.01)

(58) Field of Classification Search
CPC ...... B61L 25/021; B61L 15/0081; G01P 3/02; G01P 3/803; H04Q 9/00; H04Q 2209/40; H04Q 2209/845; H04Q 9/04
See application file for complete search history.

(56) References Cited

U.S. PATENT DOCUMENTS 9,841,287 B1 * 12/2017 Hayward ......... G08G 1/096783
2013/0342362 A1 * 12/2013 Martin ................ B61L 15/0018 374/152
(Continued)

FOREIGN PATENT DOCUMENTS

CN 107406090 A 11/2017
CN 107847166 A 3/2018
(Continued)

OTHER PUBLICATIONS

Office Action China Patent Application No. 202011209740.8, dated Mar. 6, 2026, 12 pages.

*Primary Examiner* — Eyob Hagos
(74) *Attorney, Agent, or Firm* — Stinson LLP

(57) ABSTRACT

A train speed estimation device and method are disclosed. Vibration in a natural frequency band experienced by a train as it advances is sampled by means of first and second sensors at the same sampling frequency, to obtain a first set and a second set of sampling signals respectively; a first set and a second set of vibration signals are obtained on the basis of the first set and second set of sampling signals respectively, and the first set and second set of vibration signals are subjected to cross-correlation analysis, to obtain a target sampling difference; and a train speed is calculated on the basis of the target sampling difference. The train speed estimation device and method according to the present disclosure can precisely monitor the real-time train speed without relying on any speed sensor or GNSS.

5 Claims, 3 Drawing Sheets

(51) Int. Cl.

| | |
|---|---|
| ***G01P 3/02*** | (2006.01) |
| ***H04Q 9/00*** | (2006.01) |
| ***H04Q 9/04*** | (2006.01) |

(56) References Cited

U.S. PATENT DOCUMENTS

| | | | | |
|---|---|---|---|---|
| 2014/0358377 | A1* | 12/2014 | Hammerschmidt | G01R 31/2829 702/182 |
| 2015/0236746 | A1* | 8/2015 | Scheinkerman | G06F 3/00 375/219 |
| 2016/0207552 | A1* | 7/2016 | Mian | B61L 15/0072 |
| 2017/0178421 | A1* | 6/2017 | Worden | B61L 25/021 |
| 2020/0214062 | A1* | 7/2020 | Swar | H04W 76/23 |
| 2021/0078619 | A1* | 3/2021 | Morita | B61L 15/0027 |

FOREIGN PATENT DOCUMENTS

| | | | | | |
|---|---|---|---|---|---|
| CN | 110210132 | A | * | 9/2019 | B61K 9/12 |
| CN | 111682918 | A | | 9/2020 | |
| DE | 10354944 | A1 | | 6/2005 | |
| DE | 102015224991 | A1 | | 6/2017 | |
| GB | 2392983 | A | * | 3/2004 | B61L 15/0027 |
| GB | 2516663 | A | | 2/2015 | |
| JP | H10206449 | A | | 8/1998 | |
| JP | 2019174180 | A | * | 10/2019 | |
| KR | 20110130073 | A | | 12/2011 | |
| KR | 20200061247 | A | * | 6/2020 | B61L 23/14 |
| WO | WO-2015014638 | A1 | * | 2/2015 | B61L 25/021 |

* cited by examiner

TRAIN SPEED ESTIMATION DEVICE AND METHOD BASED ON VIBRATION SIGNALS

CROSS-REFERENCE TO RELATED APPLICATION

This application claims priority to Chinese Patent Application no. 202011209740.8, filed Nov. 3, 2020, the contents of which is fully incorporated herein by reference.

TECHNICAL FIELD

The present disclosure relates to train speed estimation, in particular to a train speed estimation device and method based on vibration signals.

BACKGROUND OF THE INVENTION

In a railway train, in order to detect faults in rotating components of the train, it is generally necessary to perform precise monitoring of the real-time running speed of the train. At present, train speed monitoring uses speed sensors or is based on the global navigation satellite system (GNSS). However, speed sensors have relatively high energy consumption and hardware costs, while GNSS-based systems have very high requirements in terms of signal conditions, and in scenarios with poor signal conditions such as tunnels, it often happens that the real-time train speed cannot be obtained accurately.

SUMMARY OF THE INVENTION

In response to the above problem, the present disclosure proposes a train speed estimation device and method, which estimate the real-time train speed by synchronously sampling and analysing a vibration signal.

According to one aspect of the present disclosure, a train speed estimation device is proposed, comprising: at least one sensor pair, comprising a first sensor and a second sensor arranged in the direction of advance of a train, the first sensor and the second sensor being configured to sample, at the same sampling frequency, vibration in a natural frequency band experienced by the train as it advances, in order to obtain a first set of sampling signals and a second set of sampling signals respectively; and a processor, configured to obtain a first set of vibration signals and a second set of vibration signals based on the first set of sampling signals and the second set of sampling signals respectively, and subject the first set of vibration signals and the second set of vibration signals to cross-correlation analysis, to obtain a target sampling difference; the target sampling difference obtains a maximum cross-correlation between the first set of vibration signals and the second set of vibration signals, and the processor is configured to calculate a train speed based on the target sampling difference.

According to another aspect of the present disclosure, a train speed estimation method is proposed, comprising: sampling, at the same sampling frequency, vibration in a natural frequency band experienced by the train as it advances by means of a first sensor and a second sensor in at least one sensor pair, in order to obtain a first set of sampling signals and a second set of sampling signals respectively, wherein the first sensor and the second sensor are arranged in the direction of advance of the train; obtaining a first set of vibration signals and a second set of vibration signals based on the first set of sampling signals and the second set of sampling signals respectively, and subjecting the first set of vibration signals and the second set of vibration signals to cross-correlation analysis, to obtain a target sampling difference, wherein the target sampling difference obtains a maximum cross-correlation between the first set of vibration signals and the second set of vibration signals; and calculating a train speed based on the target sampling difference.

According to the principles of the present disclosure, the real-time train speed can be precisely monitored without relying on any speed sensor or GNSS. Compared with the prior art, the train speed estimation device and method according to the present disclosure can reduce energy consumption in real-time train speed estimation, have higher precision than a GNSS-based train speed estimation method, and are especially suitable for underground train speed estimation under non-GNSS signal conditions. In addition, the train speed estimation device and method according to the present disclosure are suitable for track vehicles of various types such as underground trains, multiple-unit trains, high-speed trains and elevated trains, and will not be affected by factors such as train type and track type.

BRIEF DESCRIPTION OF THE DRAWINGS

Based on the following detailed description of exemplary embodiments understood in conjunction with the drawings, the features and advantages of the present disclosure will become obvious. In the drawings.

DETAILED DESCRIPTION OF THE INVENTION

Exemplary embodiments of the present disclosure are described clearly and completely below in conjunction with the drawings; obviously, the exemplary embodiments described are merely some, not all, of the embodiments of the present disclosure.

An existing train speed estimation device monitors train speed using a speed sensor or a GNSS-based system, whereas the train speed estimation device according to the present disclosure synchronously samples a vibration signal by means of at least one sensor pair arranged on the train, so as to estimate the real-time train speed. Specifically, in trains of various types such as underground trains, multiple-unit trains, high-speed trains and elevated trains, there is a multi-body dynamic system with a structure that is substantially symmetric in the front-rear direction; this multi-body dynamic system may include but is not limited to structures such as train carriages, carriage-bogie connecting springs, and bogies. The multi-body dynamic system that is substantially symmetric in the front-rear direction vibrates in a natural frequency band when the train is advancing; vibration responses are similar at front-rear symmetrical positions, and there is a time difference between vibration responses at front-rear positions, this time difference being determined by the speed of advance of the train. In other words, the speed of advance of the train can be calculated from the time difference obtained by comparing vibration responses in the natural frequency band at front-rear symmetrical positions in the system. Thus, in an embodiment according to the present disclosure, vibration experienced by the train in the process of advancing is detected by means of multiple sensors arranged at different positions on the train in the direction of advance of the train, to obtain a time difference of vibration signals, and determine the speed of advance of the train according to the time difference.

Figure 1A:
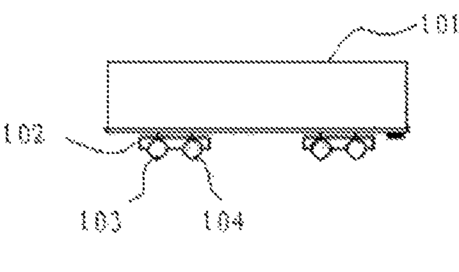
FIG. 1A shows schematically a side view of part of a train having a sensor pair provided therein according to an embodiment of the present disclosure.
Figure 1B:
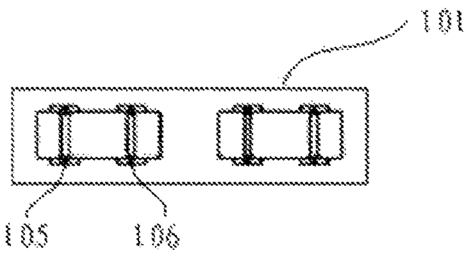
FIG. 1B shows schematically a bottom view of part of a train having a sensor pair provided therein according to an embodiment of the present disclosure.

FIG. 1A shows schematically a side view of part of a train having a sensor pair provided therein according to an embodiment of the present disclosure, and FIG. 1B shows schematically a bottom view of part of a train having a sensor pair provided therein according to an embodiment of the present disclosure.

As shown in FIGS. 1A and 1B, according to an embodiment of the present disclosure, the train comprises at least one carriage 101. At least one bogie 102 is provided below the carriage 101; a first wheel 103 and a second wheel 104 are provided at the bottom of the bogie 102. The multi-body dynamic system of the train (not shown) causes the train to vibrate in a natural frequency band when advancing. A first sensor 105 and a second sensor 106 are provided at axle centres of the first wheel 103 and second wheel 104 respectively, so as to form a sensor pair. Those skilled in the art should understand that the present disclosure is not limited to this specific arrangement of train and sensors. For example, the sensor pair can be arranged at any suitable positions on the train in the direction of advance of the train. Optionally, the train is a railway vehicle, high-speed train, underground train, elevated train or freight train.

Figure 2:
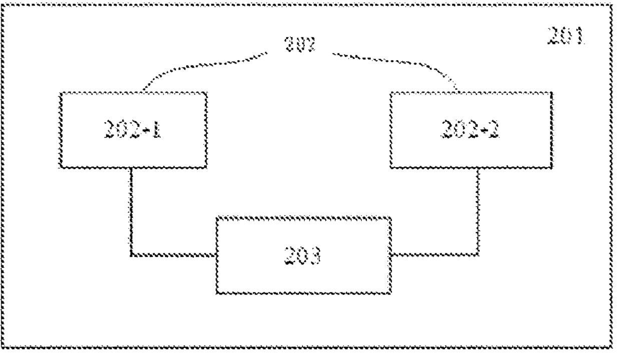
FIG. 2 shows a block diagram of a train speed estimation device according to an embodiment of the present disclosure.

FIG. 2 shows a block diagram of a train speed estimation device according to an embodiment of the present disclosure.

As shown in FIG. 2, according to an embodiment of the present disclosure, a train speed estimation device 201 comprises at least one sensor pair 202 and a processor 203. In FIG. 2, the processor 203 is shown as being arranged separately from the sensor pair 202, but the present disclosure is not limited to this. For example, the processor can be integrated with a sensor in the sensor pair. The sensor pair 202 comprises a first sensor 202-1 and a second sensor 202-2 which are arranged in the direction of advance of the train; the first sensor 202-1 and second sensor 202-2 are configured to sample, at the same sampling frequency $f_s$, vibration in the natural frequency band experienced by the train as it advances, in order to obtain a first set of sampling signals and a second set of sampling signals respectively.

Figure 3:
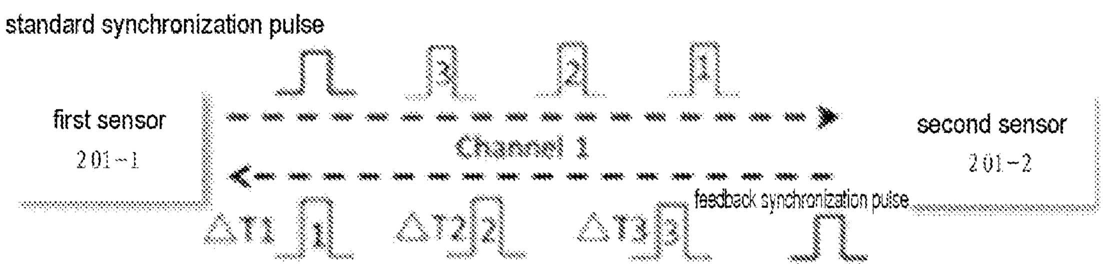
FIG. 3 shows a process of communication by the sensor pair before sampling according to an embodiment of the present disclosure.

FIG. 3 shows a process of communication by the sensor pair before sampling according to an embodiment of the present disclosure.

As shown in FIG. 3, according to an embodiment of the present disclosure, before the first sensor 202-1 and second sensor 202-2 perform sampling, the first sensor 202-1 sends P standard initial pulses to the second sensor 202-2, where p is a natural number greater than or equal to 1. For example, p=3. Whenever the second sensor 202-2 receives a standard initial pulse from the first sensor 202-1, the second sensor 202-2 sends a feedback initial pulse to the first sensor 202-1. The first sensor 202-1 and second sensor 202-2 can each record timestamps for the pulses which they send and receive. According to an embodiment of the present disclosure, different sensor pairs arranged in the train use different wireless channel frequency bands for communication, so as to avoid signal crosstalk.

If the first sensor 202-1 receives p feedback initial pulses from the second sensor 202-2, then the first sensor 202-1 sends a standard synchronization pulse to the second sensor 202-2, and begins sampling.

Otherwise, if the first sensor 202-1 does not receive p feedback initial pulses from the second sensor 202-2, then the first sensor 202-1 returns to the sub-step of sending p standard initial pulses.

If the second sensor 202-2 receives the standard synchronization pulse, i.e. a (p+1)th pulse, from the first sensor 202-1, then the second sensor 202-2 begins sampling, and sends a feedback synchronization pulse to the first sensor 202-1.

If the first sensor 202-1 receives the feedback synchronization pulse from the second sensor 202-2, then the first sensor 202-1 continues sampling.

Otherwise, if the first sensor 202-1 does not receive the feedback synchronization pulse from the second sensor 202-2, then the first sensor 202-1 stops sampling, and returns to the sub-step of sending p standard initial pulses.

If the second sensor 202-2 receives a standard synchronization pulse from the first sensor 202-1 again, then the second sensor 202-2 stops sampling, and then returns to the sub-step of beginning sampling and sending a feedback synchronization pulse to the first sensor 202-1.

According to an embodiment of the present disclosure, the above sub-steps can be repeated until the first sensor 202-1 and second sensor 202-2 complete sampling.

According to an embodiment of the present disclosure, after the first sensor 202-1 and second sensor 202-2 have completed sampling, the first sensor 202-1 calculates a sampling start time difference ΔT between time points when the first sensor 202-1 and second sensor 202-2 begin sampling, based on a time difference between the first sensor sending a standard initial pulse and receiving a corresponding feedback initial pulse.

For example, the sampling start time difference ΔT is calculated by the following formula:

$$\Delta T = \frac{1}{2p}\Sigma_{i=1}^{p}\Delta T_l,$$

where $\Delta T_l$ is the time difference between the first sensor 202-1 sending the $1_{th}$ standard initial pulse and the first sensor 202-1 receiving the $1_{th}$ feedback initial pulse from the second sensor 202-2.

Then, based on the sampling start average time difference ΔT obtained, the first sensor 202-1 aligns the first set of sampling signals obtained by the first sensor 202-1 with the second set of sampling signals obtained by the second sensor 202-2. For example, this alignment is performed by deleting sampling signals obtained by the first sensor 202-1 in the previous ΔT time period.

According to an embodiment of the present disclosure, the processor 203 is configured to process the first set of sampling signals and the second set of sampling signals obtained by the first sensor 202-1 and the second sensor 202-2. Specifically, the processor 203 is configured to obtain a first set of vibration signals and a second set of vibration signals based on the first set of sampling signals and second set of sampling signals, and subject the first set of vibration signals and second set of vibration signals to cross-correlation analysis, to obtain a target sampling difference. The target sampling difference can obtain a maximum cross-correlation between the first set of vibration signals and the second set of vibration signals. The processor 203 is further configured to calculate a train speed based on the target sampling difference.

According to an embodiment of the present disclosure, the operation of the processor 203 obtaining the first set of vibration signals and second set of vibration signals based on the first set of sampling signals and second set of sampling signals respectively may comprise the following step. The processor 203 subjects the first set of sampling signals and second set of sampling signals to spectrum analysis, so as to obtain a characteristic frequency band $[f_l, f_h]$ having an amplitude higher than a particular threshold in a low-frequency range, and sets $f_l$ and $f_h$ as fixed parameters. For example, the low-frequency range is 200 Hz and lower.

Then, the processor 203 filters the first set of sampling signals and second set of sampling signals in the characteristic frequency band $[f_l, f_h]$, so as to obtain the first set of vibration signals $X_j(i)$ and second set of vibration signals $X_k(i)$, $i=1, 2, \ldots m$, where m is the total number of vibration signals in each set. For example, the filtering may be bandpass filtering.

According to an embodiment of the present disclosure, the operation of the processor 203 subjecting the first set of vibration signals and second set of vibration signals to cross-correlation analysis may comprise the following step. The processor 203 subjects the first set of vibration signals $X_j(i)$ and second set of vibration signals $X_k(i)$ to cross-correlation calculation, to obtain a cross-correlation $R_{jk}(\tau)$ of the first set of vibration signals $X_j(i)$ and second set of vibration signals $X_k(i)$, where $\tau$ is a sampling difference between the first set of vibration signals $X_j(i)$ and second set of vibration signals $X_k(i)$.

By cross-correlation analysis, the processor 203 obtains the target sampling difference $\tau_{jkd}$ capable of obtaining the maximum cross-correlation between the first set of vibration signals $X_j(i)$ and the second set of vibration signals $X_k(i)$. For example, when $\tau=\tau_{jkd}$, the maximum absolute value $\max|R_{jk}(\tau)|$ of $R_{jk}(\tau)$ is obtained.

According to an embodiment of the present disclosure, the operation of the processor 203 calculating the train speed based on the target sampling difference may comprise the following step. Based on the target sampling difference $\tau_{jkd}$ obtained, the processor 203 calculates a time difference $t_{jkd}$ between the first set of vibration signals $X_j(i)$ and the second set of vibration signals $X_k(i)$. For example, the time difference $t_{jkd}$ is calculated by the following formula:

$$t_{jkd} = \frac{1}{f_c}\tau_{jkd}.$$

Then, based on the time difference $t_{jkd}$ obtained, the processor 203 calculates the train speed $V_{jk}$. For example, the train speed $V_{jk}$ is calculated by the following formula:

$$V_{jk} = \frac{L_{jk}}{t_{jkd}},$$

where $L_{jk}$ is the horizontal distance between the first sensor 202-1 and the second sensor 202-2.

According to an embodiment of the present disclosure, the processor 203 judges whether the train speed $V_{jk}$ obtained is within a conventional train speed range. For example, if the train speed $V_{jk}$ is within some sensible interval above and including 20 km/h, then the calculation of train speed is judged to be valid. If the train speed $V_{jk}$ is not within the conventional train speed range, then the processor 203 disregards the train speed. For example, if the calculated train speed exceeds a specific range, this generally might be caused by vibration interference signals in the same frequency band $[f_l, f_h]$. Thus, the processor 203 uses the train speed $V_{jk}$ falling within a normal range as an estimated train speed.

According to an embodiment of the present disclosure, based on the estimated train speed and wheel circumference, the processor 203 calculates the wheel rotation speed.

The train speed estimation device according to the present disclosure can precisely monitor the real-time train speed without relying on any speed sensor or GNSS. Compared with the prior art, the train speed estimation device according to the present disclosure can reduce energy consumption in real-time train speed estimation, has higher precision than a GNSS-based train speed estimation method, and is especially suitable for underground train speed estimation under non-GNSS signal conditions. In addition, the train speed estimation device according to the present disclosure is suitable for track vehicles of various types such as underground trains, multiple-unit trains, high-speed trains and elevated trains, and will not be affected by factors such as train type and track type.

A train speed estimation method according to an embodiment of the present disclosure is described below with reference to FIGS. 4 and 5. The train speed estimation method is applied to a train having at least one sensor pair provided thereon, the sensor pair comprising a first sensor and a second sensor arranged in the direction of advance of the train. The train speed estimation method corresponds to the train speed estimation device described above, so some details are not described again below.

Figure 4:
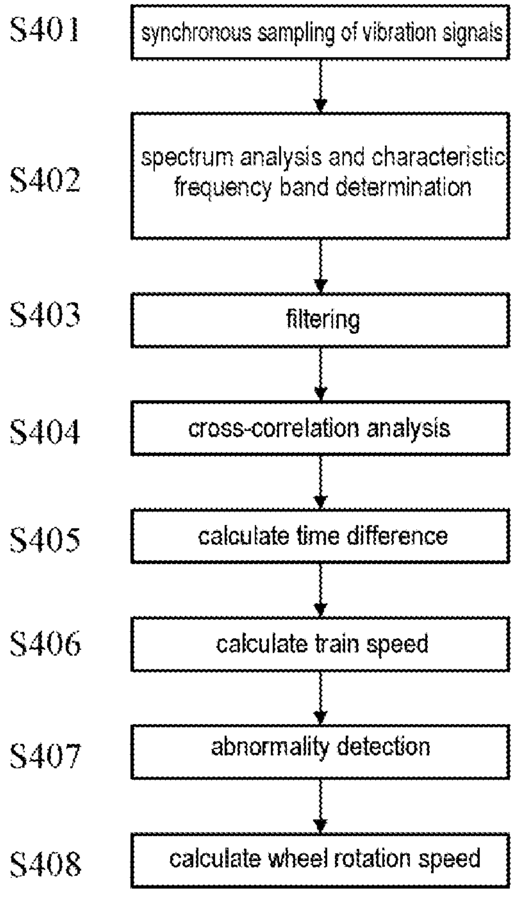
FIG. 4 shows a flow chart of a train speed estimation method according to an embodiment of the present disclosure.

FIG. 4 shows a flow chart of a train speed estimation method according to an embodiment of the present disclosure. FIG. 5 shows a flow chart of communication by the sensor pair before sampling according to an embodiment of the present disclosure.

As shown in FIG. 4, according to an embodiment of the present disclosure, in step S401, a first sensor and a second sensor perform sampling, at the same sampling frequency $f_s$, of vibration in a natural frequency band experienced by a train as it advances, in order to obtain a first set of sampling signals and a second set of sampling signals respectively.

Figure 5:
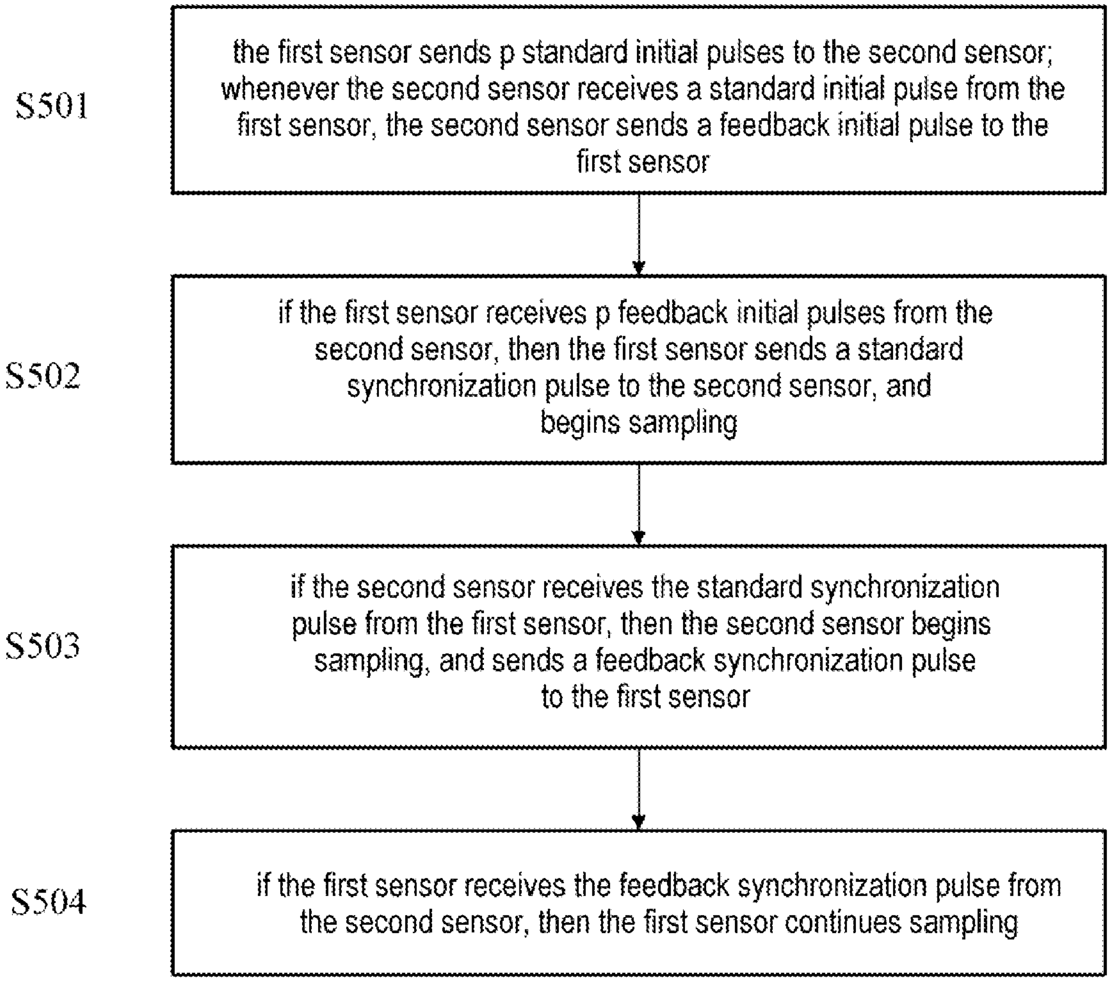
FIG. 5 shows a flow chart of communication by the sensor pair before sampling according to an embodiment of the present disclosure.

As shown in FIG. 5, according to an embodiment of the present disclosure, before the first sensor and second sensor conduct sampling, in a sub-step S501, the first sensor sends p standard initial pulses to the second sensor, where p is a natural number greater than or equal to 1. For example, p=3. Whenever the second sensor receives a standard initial pulse from the first sensor, the second sensor sends a feedback initial pulse to the first sensor. The first sensor and second sensor can each record timestamps for the pulses which they send and receive. According to an embodiment of the present disclosure, different sensor pairs arranged in the train use different wireless channel frequency bands for communication, so as to avoid signal crosstalk.

In a sub-step S502, if the first sensor receives p feedback initial pulses from the second sensor, then the first sensor sends a standard synchronization pulse to the second sensor, and begins sampling.

Otherwise, if the first sensor does not receive p feedback initial pulses from the second sensor, then the first sensor returns to the sub-step S501 of sending p standard initial pulses.

In sub-step S503, if the second sensor receives the standard synchronization pulse, i.e. a (p+1)th pulse, from the first sensor, then the second sensor begins sampling, and sends a feedback synchronization pulse to the first sensor.

In a sub-step S504, if the first sensor receives the feedback synchronization pulse from the second sensor, then the first sensor continues sampling.

Otherwise, if the first sensor does not receive the feedback synchronization pulse from the second sensor, then the first sensor stops sampling, and returns to the sub-step S501 of sending p standard initial pulses.

If the second sensor receives a standard synchronization pulse from the first sensor again, then the second sensor stops sampling, and then returns to the sub-step S503 of beginning sampling and sending a feedback synchronization pulse to the first sensor.

According to an embodiment of the present disclosure, the above sub-steps can be repeated until the first sensor and second sensor complete sampling.

According to an embodiment of the present disclosure, after the first sensor and second sensor have completed sampling, the first sensor calculates a sampling start time difference $\Delta T$ between time points when the first sensor and second sensor begin sampling, based on a time difference between the first sensor sending a standard initial pulse and receiving a corresponding feedback initial pulse.

Then, based on the sampling start average time difference $\Delta T$ obtained, the first sensor aligns the first set of sampling signals obtained by the first sensor with the second set of sampling signals obtained by the second sensor. For example, this alignment is performed by deleting sampling signals obtained by the first sensor in the previous $\Delta T$ time period.

Returning to FIG. 4, according to an embodiment of the present disclosure, in step S402, the first set of sampling signals and second set of sampling signals are subjected to spectrum analysis, so as to obtain a characteristic frequency band $[f_l, f_h]$ having an amplitude higher than a particular threshold in a low-frequency range, and $f_l$ and $f_h$ are set as fixed parameters.

In step S403, the first set of sampling signals and second set of sampling signals are filtered in the characteristic frequency band $[f_l, f_h]$, so as to obtain a first set of vibration signals $X_j(i)$ and a second set of vibration signals $X_k(i)$, i=1, 2, . . . m, where m is the total number of vibration signals in each set.

In step S404, the first set of vibration signals $X_j(i)$ and second set of vibration signals $X_k(i)$ are subjected to cross-correlation analysis, to obtain a target sampling difference $\tau_{jkd}$ capable of obtaining the maximum cross-correlation between the first set of vibration signals $X_j(i)$ and the second set of vibration signals $X_k(i)$.

In step S405, based on the target sampling difference $\tau_{jkd}$ obtained, a time difference $t_{jkd}$ between the first set of vibration signals $X_j(i)$ and the second set of vibration signals $X_k(i)$ is calculated.

In step S406, based on the time difference $t_{jkd}$ obtained, a train speed $V_{jk}$ is calculated.

In step S407, a judgement is made as to whether the train speed $V_{jk}$ obtained is within a conventional train speed range. If the train speed $V_{jk}$ is not within the conventional train speed range, then the train speed is disregarded. Thus, the train speed $V_{jk}$ falling within a normal range is used as an estimated train speed.

In step S408, based on the estimated train speed and wheel circumference, a wheel rotation speed is calculated.

The train speed estimation method according to the present disclosure can precisely monitor the real-time train speed without relying on any speed sensor or GNSS. Compared with the prior art, the train speed estimation method according to the present disclosure can reduce energy consumption in real-time train speed estimation, has higher precision than a GNSS-based train speed estimation method, and is especially suitable for underground train speed estimation under non-GNSS signal conditions. In addition, the train speed estimation method according to the present disclosure is suitable for track vehicles of various types such as underground trains, multiple-unit trains, high-speed trains and elevated trains, and will not be affected by factors such as train type and track type.

The functions of the various elements shown in the drawings can be provided by using dedicated hardware, and hardware linked to suitable software and capable of executing the software. When provided by a processor, functions can be provided by a single dedicated processor, a single shared processor or multiple independent processors (some of which can be shared). In addition, the explicit use of the term "processor" or "controller" should not be interpreted as specifically referring to hardware capable of running software, and can implicitly include but is not limited to digital signal processor (DSP) hardware, read-only memory (ROM) for storing software, random access memory (RAM) and non-volatile memory.

This description has explained the principles of the present disclosure. Thus, it should be understood that those skilled in the art will be able to design various arrangements which, although not explicitly described or shown herein, embody the principles of the present disclosure and are included in the spirit and scope thereof.

All examples and conditional language expounded herein are intended to be used for teaching purposes, to help the reader understand the principles of the present disclosure and the concept proposed by the inventor for advancing the art, and should be understood to not be limited to these specifically expounded examples and conditions.

In addition, all statements herein expounding the principles, aspects and embodiments of the present disclosure and particular examples thereof are intended to encompass structural and functional equivalents thereof. Furthermore, such equivalents are intended to include currently known equivalents and equivalents developed in future, i.e. any elements developed which perform the same function, regardless of the structure.

Citation herein of "an embodiment" or "embodiments" of the present disclosure and other variants thereof means that the specific features, structure and characteristics etc. described in conjunction with the embodiment are included in at least one embodiment. Thus, the phrase "in an embodiment" or "in embodiments" appearing in different places throughout the specification, and any other variant, do not necessarily all refer to the same embodiment.

The invention claimed is:

1. A train car having a train speed estimation device, the train car comprising:

a carriage; a bogie attached to the carriage; a first wheel is provided on the bogie; a second wheel is provided on the bogie;

at least one sensor pair, comprising a first sensor, located at an axle center of the first wheel, and a second sensor located at an axle center of the second wheel, the first sensor and the second sensor being arranged in the direction of advance of a train, the first sensor and the second sensor being configured to measure, at the same sampling frequency, natural harmonic vibrational frequencies experienced by the train as it advances, in order to obtain a first set of sampling signals and a second set of sampling signals respectively;

a processor, configured to obtain a first set of vibration signals and a second set of vibration signals based on the first set of sampling signals and the second set of sampling signals respectively, the processor being configured to filter the first set of vibration signals and the second set of vibrations signals and subject the first set of vibration signals and the second set of vibration signals to cross-correlation analysis, to obtain a target sampling difference; the target sampling difference obtains a maximum cross-correlation between the first set of vibration signals and the second set of vibration signals, and the processor is configured to calculate a train speed based on the target sampling difference without relying on any speed sensor or global navigation satellite system;

wherein the processor is further configured to obtain a characteristic frequency band of the first set of sampling signals and the second set of sampling signals having an amplitude higher than a threshold in a low-frequency range, and filter the first set of sampling signals and the second set of sampling signals in the characteristic frequency band, in order to obtain the first set of vibration signals and the second set of vibration signals;

wherein before the first sensor and the second sensor perform the sampling, the first sensor is further configured to send p standard initial pulses, where p is a natural number greater than or equal to 1, and the second sensor is further configured to send a feedback initial pulse whenever it receives the standard initial pulses;

if the first sensor receives the feedback initial pulse, then the first sensor is further configured to send a standard synchronization pulse and begin the sampling;

if the second sensor receives the standard synchronization pulse, then the second sensor is further configured to begin the sampling and send a feedback synchronization pulse; and if the first sensor receives the feedback synchronization pulse, then the first sensor is further configured to continue the sampling; and wherein if the first sensor does not receive the feedback synchronization pulse, then the first sensor is further configured to stop the sampling, and return to the step of sending the standard initial pulses; and if the second sensor receives the standard synchronization pulse again, then the second sensor is further configured to stop the sampling, and then return to the step of beginning the sampling and sending the feedback synchronization pulse.

2. The train car according to claim 1, wherein after the first sensor and the second sensor have completed the sampling, the first sensor is further configured to calculate a sampling start time difference based on a time difference between the first sensor sending the standard initial pulse and receiving the corresponding feedback initial pulse, and align the first set of sampling signals with the second set of sampling signals based on the sampling start time difference.

3. The train car according to claim 1, wherein different sensor pairs in the at least one sensor pair are configured to use different wireless channel frequency bands for communication.

4. The train car according to claim 1, wherein the processor is further configured to judge whether the calculated train speed is within a specific range, and disregard the train speed if the train speed is not within the specific range.

5. A train speed estimation method, comprising:

providing a carriage; providing a bogie attached to the carriage; providing a first wheel located on the bogie; providing a second wheel located on the bogie; providing a first sensor located at an axle center of the first wheel; providing a second sensor located at an axle center of the second wheel;

measuring, at the same sampling frequency, natural harmonic vibrational frequencies experienced by the train as it advances by means of the first sensor and the second sensor which together form a sensor pair, in order to obtain a first set of sampling signals and a second set of sampling signals respectively, wherein the first sensor and the second sensor are arranged in the direction of advance of the train;

obtaining a first set of vibration signals and a second set of vibration signals based on the first set of sampling signals and the second set of sampling signals respectively, filtering the first set of vibration signals and the second set of vibration signals, subjecting the first set of vibration signals and the second set of vibration signals to cross-correlation analysis, to obtain a target sampling difference, wherein the target sampling difference obtains a maximum cross-correlation between the first set of vibration signals and the second set of vibration signals;

calculating a train speed based on the target sampling difference without relying on any speed sensor or global navigation satellite system;

determining whether the train speed which was calculated is within a specific range and disregarding the train speed if the train speed is not within a specific range;

obtaining a characteristic frequency band of the first set of sampling signals and the second set of sampling signals having an amplitude higher than a threshold in a low-frequency range, and filter the first set of sampling signals and the second set of sampling signals in the characteristic frequency band, in order to obtain the first set of vibration signals and the second set of vibration signals;

before the first sensor and the second sensor perform the sampling, the first sensor sending p standard initial pulses, where p is a natural number greater than or equal to 1, and the second sensor sending a feedback initial pulse whenever it receives the standard initial pulses;

if the first sensor receives the feedback initial pulse, then the first sensor sends a standard synchronization pulse and begins the sampling; if the second sensor receives the standard synchronization pulse, then the second sensor begins the sampling and sends a feedback synchronization pulse; and if the first sensor receives the feedback synchronization pulse, then the first sensor continues the sampling; and wherein if the first sensor does not receive the feedback synchronization pulse, then the first sensor is further configured to stop the sampling, and return to the step of sending the standard initial pulses; and if the second sensor receives the standard synchronization pulse again, then the second sensor is further configured to stop the sampling, and then return to the step of beginning the sampling and sending the feedback synchronization pulse.

* * * * *